Patented Mar. 22, 1949

2,465,280

UNITED STATES PATENT OFFICE 2,465,280

ALPHA IRON OXIDE-ALKALI METAL TRI-OXALATO FERRIATE CATALYST AND PROCESS OF PREPARATION

James C. Schiller, Baytown, Tex., assignor, by mesne assignments, to Standard Oil Development Company, Elizabeth, N. J., a corporation of Delaware No Drawing. Original application December 20, 1946, Serial No. 717,578. Divided and this application June 1, 1948, Serial No. 30,498

10 Claims. (Cl. 252—474)

1

The present invention is directed to a method for preparing a composition adapted to be used as a catalyst.

This application is a division of U. S. Serial No. 717,578, filed December 20, 1946.

It is known to the art to pass a mixture of carbon monoxide and hydrogen at elevated temperatures and pressures over a catalyst to obtain hydrocarbons and oxygenated derivatives of hydrocarbons as products. When carrying out such reactions it is preferred to employ a temperature in the range of 450° to 675° F. and a pressure in the range of 100 to 500 lbs./sq. in. Such processes of reacting hydrogen and carbon monoxide to obtain hydrocarbon product are usually designated as a Fischer-Tropsch synthesis. Heretofore when conducting such reactions, it has been customary to employ oxides of such metals as iron, cobalt and nickel as a catalyst; the oxides may be used alone but preferably are used as supported catalysts which are formed by impregnating aluminum oxide, kieselguhr, or similar carriers with one or more of the desired oxides.

It is an object of the present invention to devise a method for preparing a catalyst. More particularly, it is an object of the present invention to devise a method for preparing a catalyst particularly adapted for use in the Fischer-Tropsch synthesis.

The present invention may be described briefly as involving the preparation of a mixture of iron oxide and an alkali metal trioxalato ferriate, heating the mixture to a high temperature in the presence of an oxidizing atmosphere and then contacting the oxidized mass with a reducing atmosphere at superatmospheric temperatures to obtain an active catalyst mass.

The alkali metal trioxalato ferriate employed in preparing the catalyst in accordance with the present invention is preferably potassium trioxalato ferriate, but may be sodium trioxalato ferriate or lithium trioxalato ferriate. The lithium trioxalato ferriate is less desirable to employ than the sodium or potassium compound in view of the more expensive nature of the lithium compound than the other two.

The iron oxide employed in preparing the catalyst in accordance with the present invention may be alpha or gamma iron oxide or ferro-ferric oxide. Ordinarily it is desirable to employ the iron oxide in an amount between 80 and 99.8% and the alkali metal trioxalato ferriate in an amount between 0.2 and 20%.

In accordance with one method of preparing

2 the catalyst, the following description is given: 25 parts of $Fe_2(SO_4)_3$, 50 parts $BaC_2O_4.H_2O$ are placed in 600 parts of water and digested for several hours on a steam bath. The resulting solution is filtered and the precipitate washed with hot water. The filtrate is evaporated and on cooling a light green potassium trioxalato ferriate crystallizes in quantitative yield. It is desirable to employ ferric sulfate and barium oxalate in the foregoing preparation since the elimination of foreign ions is very simple. The light green potassium trioxalato ferriate prepared in accordance with the foregoing description is then added to a weighed amount of ferro-ferric oxide in an amount sufficient to give a catalyst composition conforming to 95% of $Fe_3O_4$ and 5% $K_3Fe(C_2O_4)_3.3H_2O$. The admixture is then dissolved or suspended in sufficient water to form a thin mullable slurry and thoroughly admixed. The slurry is then dried at 100° C., pulverized, pelleted, and the resulting pills subjected to a heat treatment for about 4½ hours at a temperature of about 1000° F. in the presence of a free oxygen-containing atmosphere such as air. A catalyst prepared in this manner was then subjected to a reducing treatment with hydrogen gas for 24 hours at 700° F. with the hydrogen gas passing over the catalyst at a feed rate of 1000 volumes per volume of catalyst per hour.

The reduced catalyst prepared as illustrated above was then employed in the synthesis of hydrocarbons and oxygenated compounds by passing a synthesis gas mixture of one to one ratio of hydrogen to carbon monoxide over it at 150 pounds of pressure per square inch gauge, at a feed rate of 200 volumes of gas per volume of catalyst per hour, at a temperature between 550° and 575° F.

The catalyst prepared in accordance with the present invention was employed for 264 hours and substantial yields of $C_4$ and heavier hydrocarbons were obtained throughout the operating period. The amount of $C_4$ hydrocarbons obtained averaged 194 cc. per cubic meter of feed gas. Quantities of water ranging between 31 and 57 cc. per cubic meter of feed gas were also produced. The hydrocarbons produced contained valuable amounts of olefinic hydrocarbons, alcohols, aldehydes and organic acids while the water contained appreciable quantities of alcohols, aldehydes, and organic acids. As another and perhaps more desirable alternate method for producing an alkali metal trioxalato ferriate, reference will be made to the following description in which a catalyst comprising iron oxide and potassium trioxalato ferriate was prepared: 20 parts of $Fe_2(SO_4)_3$ and 100 grams $K_2C_2O_4$ were added separately to sufficient water to dissolve to form two solutions. The two solutions were then admixed and heated to evaporate approximately half of the water. The evaporated solution was then chilled to a temperature in the range of approximately 32 to 50° F. for about 12 hours. The resulting crystals were filtered free of water and then dried. 12½ parts of the dried crystals were added to 250 parts of ferro-ferric oxide and well mixed with 150 parts of water. After mixing the mixture was dried at 100° C. and the dried catalyst pulverized to 20 mesh and pilled. The pills were heated in a free oxygen-containing atmosphere for 4½ hours at 1000° F. The catalyst prepared in accordance with the foregoing description was then employed to synthesize hydrocarbons in a mixture of carbon monoxide and hydrogen at a temperature of 500° F., approximately 150 pounds of pressure per square inch gauge, and a feed rate of 203 to 215 volumes of feed per volume of catalyst per hour. Appreciable quantities of hydrocarbons including butane and heavier were produced nearly immediately as well as substantial quantities of water.

While the ratios of alkali metal trioxalato ferriate to the iron oxide in the catalyst prepared in accordance with the present invention may vary between 0.2 and 20% of the alkali metal trioxalato ferriate and 80 to 99.8% of iron oxide, it is preferred to employ between 2 and 5% by weight of alkali metal trioxalato ferriate and approximately 95 to 98% of iron oxide.

While examples of temperature and pressure conditions suitable for use in the practice of the preesnt invention have been given to illustrate the advantages of the present invention, it will be obvious to a worker skilled in the art that temperatures and pressures over a substantial range may be employed and good results obtained. It will also be obvious that the stabilizing material admixed with the iron oxide may be present over a substantial range and satisfactory results obtained. Accordingly, it is intended to embrace such ranges by the claims appended hereto.

Having fully described and illustrated the practice of the present invention, what is desired to be claimed as new and useful and to secure by Letters Patent is:

1. A method for preparing a catalyst adapted for use in a Fischer-Tropsch synthesis which consists of the steps of preparing a mixture of alpha iron oxide in an amount in the range between 80% and 99.8% by weight and an alkali metal trioxalato ferriate in an amount in the range between 0.2% and 20% by weight, heating said mixture at a superatmospheric temperature of about 1000° F. in the presence of a free oxygen-containing atmosphere for about 4 hours, and subsequently contacting the mixture with a reducing atmosphere at a superatmospheric temperature of about 700° F. for about 24 hours.

2. A method in accordance with claim 1 in which the alkali metal trioxalato ferriate is sodium trioxalato ferriate.

3. A method in accordance with claim 1 in which the alkali metal trioxalato ferriate is lithium trioxalato ferriate.

4. A method in accordance with claim 1 in which the alkali metal trioxalato ferriate is potassium trioxalato ferriate.

5. A method for producing a catalyst suitable for use in the Fischer-Tropsch synthesis which consists of the steps of admixing alpha iron oxide in the form of powder with potassium trioxalato ferriate crystals and water to form a mullable slurry, the proportions of the components of said slurry being adjusted to provide a catalyst mass consisting of approximately 95% by weight of alpha iron oxide and approximately 5% by weight of potassium trioxalato ferriate, thoroughly admixing said slurry, drying it to form a solid mass, heating the solid mass in the presence of a free oxygen-containing atmosphere at a temperature of about 1000° F. for about 4 hours and subsequently subjecting the heated mass to a reducing atmosphere at a temperature of about 700° F. for about 24 hours.

6. A composition adapted for use as a catalyst in the production of hydrocarbons and oxygenated hydrocarbons which consists of an intimate mixture of alpha iron oxide in an amount in the range between 80% and 99.8% by weight and an alkali metal trioxalato ferriate in an amount in the range between 0.2% and 20% by weight, which mixture has been contacted with an oxidizing atmosphere at a temperature of about 1000° F. for about 4 hours and then with a reducing atmosphere at a superatmospheric temperature of about 700° F. for approximately 24 hours.

7. A composition in accordance with claim 6 in which the alkali metal trioxalato ferriate is sodium trioxalato ferriate.

8. A composition in accordance with claim 6 in which the alkali metal trioxalato ferriate is lithium trioxalato ferriate.

9. A composition in accordance with claim 6 in which the alkali metal trioxalato ferriate is potassium trioxalato ferriate.

10. A composition adapted for use as a catalyst in the production of hydrocarbons and oxygenated hydrocarbons which consists of an intimate mixture of approximately 95% by weight of alpha iron oxide and approximately 5% by weight of potassium trioxalato ferriate, which composition has been contacted with an oxidizing atmosphere at a temperature of about 1000° F. for about 4 hours and then with a reducing atmosphere at a superatmospheric temperature of about 700° F. for approximately 24 hours.

JAMES C. SCHILLER.

No references cited.